United States Patent [19]

Freier et al.

[11] 4,168,121
[45] Sep. 18, 1979

[54] AUTOMATIC SNOW/BEACH CORRECTION FOR PHOTOGRAPHIC PRINTER

[75] Inventors: Jan T. Freier; Ronald B. Harvey; John Poné, Jr., all of Minneapolis, Minn.

[73] Assignee: Pako Corporation, Minneapolis, Minn.

[21] Appl. No.: 896,812

[22] Filed: Apr. 17, 1978

[51] Int. Cl.² ............................................. G03B 27/78
[52] U.S. Cl. ........................................ 355/38; 355/88
[58] Field of Search ............................... 355/35–38, 355/68, 83, 88, 77; 356/175, 202, 203, 404, 443, 444

[56] References Cited

U.S. PATENT DOCUMENTS

| | | | |
|---|---|---|---|
| 2,529,975 | 11/1950 | Smith | 96/23 |
| 3,090,289 | 5/1963 | Gundelfinger | 355/88 |
| 3,152,897 | 10/1964 | Huboi et al. | 96/23 |
| 3,184,307 | 5/1965 | Letzer | 96/23 |
| 3,232,192 | 2/1966 | Stimsen | 354/31 |
| 3,245,309 | 4/1966 | Wick et al. | 355/37 |
| 3,497,611 | 2/1970 | Orthmann et al. | 355/38 |
| 3,502,410 | 3/1970 | King et al. | 355/38 |
| 3,519,347 | 7/1970 | Bowker et al. | 355/88 |
| 3,523,728 | 8/1970 | Wick et al. | 355/32 |
| 3,527,540 | 9/1970 | Bowker et al. | 250/226 |
| 3,575,508 | 4/1971 | Fergg et al. | 355/88 |
| 3,591,375 | 7/1971 | Neale | 96/23 |
| 3,612,683 | 10/1971 | Riley et al. | 355/35 |
| 3,653,759 | 4/1972 | Klein | 355/38 |
| 3,669,553 | 6/1972 | Harvey | 356/202 |
| 3,690,765 | 9/1972 | Rickard et al. | 355/97 |
| 3,694,074 | 9/1972 | Huboi et al. | 355/38 |
| 3,709,601 | 1/1973 | Zahn et al. | 355/38 |
| 3,709,613 | 1/1973 | Zahn et al. | 356/202 |
| 3,724,947 | 4/1973 | Paulus | 355/38 |
| 3,790,275 | 2/1974 | Huboi et al. | 355/68 |
| 3,813,158 | 5/1974 | Zahn et al. | 355/38 |
| 3,873,200 | 3/1975 | Crete et al. | 355/38 |
| 3,888,580 | 6/1975 | Amano et al. | 355/38 |
| 3,944,362 | 3/1976 | Dailey | 355/38 |
| 4,017,179 | 4/1977 | Pone, Jr. et al. | 355/68 |
| 4,092,067 | 5/1978 | Grossman | 355/77 |
| 4,100,424 | 7/1978 | Akimoto et al. | 250/559 |
| 4,101,216 | 7/1978 | Grossman | 355/35 |
| 4,101,217 | 7/1978 | Fergg et al. | 355/38 |

FOREIGN PATENT DOCUMENTS 1016561  1/1966  United Kingdom ........................ 355/38

OTHER PUBLICATIONS

"How Does the Gretag Scanning System Work." Journal of SMPTE, vol. 65, pp. 205–215, Apr. 1956, Barttelson and Huboi, "Exposure Determination Methods for Color Printing: The Concept of Optimum Correction Level."
Ilford Journal on Photography and the Graphic Arts, vol. 3, No. 3, pp. 17–23, 1965, D. M. Neale, "Control in Color Negative Printing," Gretag Color Scanning Color Printer 3140.

Primary Examiner—L. T. Hix
Assistant Examiner—W. J. Brady
Attorney, Agent, or Firm—Kinney, Lange, Westman and Fairbairn

[57] ABSTRACT

An automatic system for classifying photographic negatives containing snow or beach scenes measures the red, green, and blue densities of the negative to be printed. Signals indicative of red, green, and blue exposure times are derived from these measured densities, and the signal indicative of the blue exposure time is compared to the signals indicative of the red and green exposure times. The results of this comparison indicate whether a snow or beach scene is present. To determine the amount of density correction, if any, the densities of the negative at a plurality of points are measured. The extent of the density correction is determined by the number of points whose density is within a predetermined interval of the maximum density measured from any one of the points.

19 Claims, 4 Drawing Figures

AUTOMATIC SNOW/BEACH CORRECTION FOR PHOTOGRAPHIC PRINTER

REFERENCE TO CO-PENDING APPLICATIONS

Reference is made to a co-pending patent application Ser. No. 896,632 by J. Freier, R. Harvey, and J. Poné, Jr. entitled "Automatic Exposure Corrections for Photographic Printer" which was filed on even date with the present application and is assigned to the same assignee as the present application.

BACKGROUND OF THE INVENTION

The present invention relates to photographic printers. In particular, the present invention relates to a system for automatically classifying and correcting exposure times for negatives containing snow or beach scenes.

Photographic printers produce color or black and white prints or transparencies from photographic film originals (generally negatives). High intensity light is passed through the film and imaged on the photosensitive print medium (film or paper). The photographic emulsion layers on the print paper or film are exposed and subsequently processed to produce a print of the scene contained in the original.

A critical portion of a photographic printer is the exposure control, which controls the exposure of the photosensitive medium in order to ensure that the image on the photosensitive medium is properly exposed. The exposure control may utilize inputs from several different sources in order to determine the proper exposure. Most automatic and semiautomatic printers use large area transmission density (LATD) sensors to sample the light transmitted by the negative either prior to or during the exposure. LATD sensors measure the average density of the negative in each of three color channels, typically red, green, and blue. Control of the exposure is then determined using a method known as "integration to grey." With this technique, it is assumed that the colors of the scene in the negative will integrate to grey over the print area, since the scene will typically contain equal amounts of all three colors.

While LATD measurements result in proper exposure for the majority of all prints, there are certain classes of negatives which are misexposed by a printer if exposure is determined solely by integration to grey. One parameter in evaluating the performance of a photographic printer is the "good print yield," which is determined by dividing the number of saleable prints by the number of printable negatives. Remakes (in which the printer misexposes a negative which can be reprinted to give a saleable print) detract from the good print yield. Remakes consist of many broad failure types, which include (1) subject density failures, (2) subject color failures, (3) color failures, (4) density failures, and (5) snow scenes and beach/water scenes.

A subject density failure is a negative in which LATD generated exposure times misexpose the subject (as opposed to the background of the scene). In general, subject density failures require only a plus (+) density correction.

Subject color failures are negatives in which a predominant background color causes the printer to print the subject with an excess of the compliment color. A typical example of a subject color failure is a baby on a red rug; most printers will print the baby with inacceptable cyan color. Subject color failures typically require color correction.

A color failure negative is a negative which has both the subject and background off color in the same color. This is often caused by out of date, overheated film or as a result of incandescent or fluorescent lit scenes. Color failure negatives typically require only color correction from the exposures which could be dictated by the LATD measurements.

Density failure negatives (in which both the subject and background are over- or underexposed) involve only a density correction from the LATD generated print times.

Snow scenes and beach/water scenes may require a small minus (−) density and/or color correction.

Automatic photographic printers have been developed which include systems for recognizing subject density and subject color failure negatives. These systems generally include a density or color measuring system which provides measurements of the transmission density of the negative at defined discrete or continuous areas, as opposed to an average or integrated measurement over the entire negative (i.e. the LATD measurements). The measurements at discrete or continuous areas have been used either to modify the exposure times derived by LATD measurements, or as the sole means of exposure determination. Examples of these mechanisms are described in the following U.s. Pat. Nos.: Stimson 3,232,192; Wick et al 3,345,309; Bowker et al 3,519,347; Wick et al 3,523,728; Harvey 3,669,553; Rickard et al 3,690,765; Huboi et al 3,694,074; Zahn et al 3,709,613; Paulous 3,724,947; Huboi et al 3,790,275; Zahn et al 3,813,158; Crete et al 3,873,200; Amano et al 3,888,580; Dailey 3,944,362; Poné, Jr. et al 4,017,179.

Two photographic printer systems manufactured by Gretag Ltd. Utilizes a color scanner which measures red, green, and blue densities at about 100 measuring points distributed over the entire negative. One system is the 3140 automatic color printer, the other system includes the Gretag 3155 film scanner, the 3160 printer control station, and the 3116/3117 automatic color printer. Both systems provide a minus (−) correction for beach and snow pictures as well as for long distance shots. This correction is based upon the blue density of the negatives. If the integral blue density of a negative exceeds the blue density of a standard negative by a certain margin, a minus (−) correction is applied. These parameters can be selected arbitrarily.

SUMMARY OF THE INVENTION

The present invention is an improved system for automatically recognizing snow and beach scenes and determining what correction, if any, is necessary. In a preferred embodiment of the present invention, the red, green, and blue densities of the film to be printed are measured and signals indicative of red, green, and blue exposure times are derived from these measured densities. To determine whether the film contains a snow or a beach scene, the signal indicative of the blue exposure time is compared to the average of the signals indicative of the red and green exposure times.

The extent of correction (once a snow or beach scene has been identified) is preferably determined by density measurements of the film at defined discrete or continuous areas. The point or area having the maximum density is determined, and the number of other points or areas having densities which fall within a predetermined interval below the maximum density is also determined. The extent of the correction, if any, depends upon the number of points which fall within the predetermined interval.

DETAILED DESCRIPTION OF THE PREFERRED EMBODIMENTS

Figure 1:
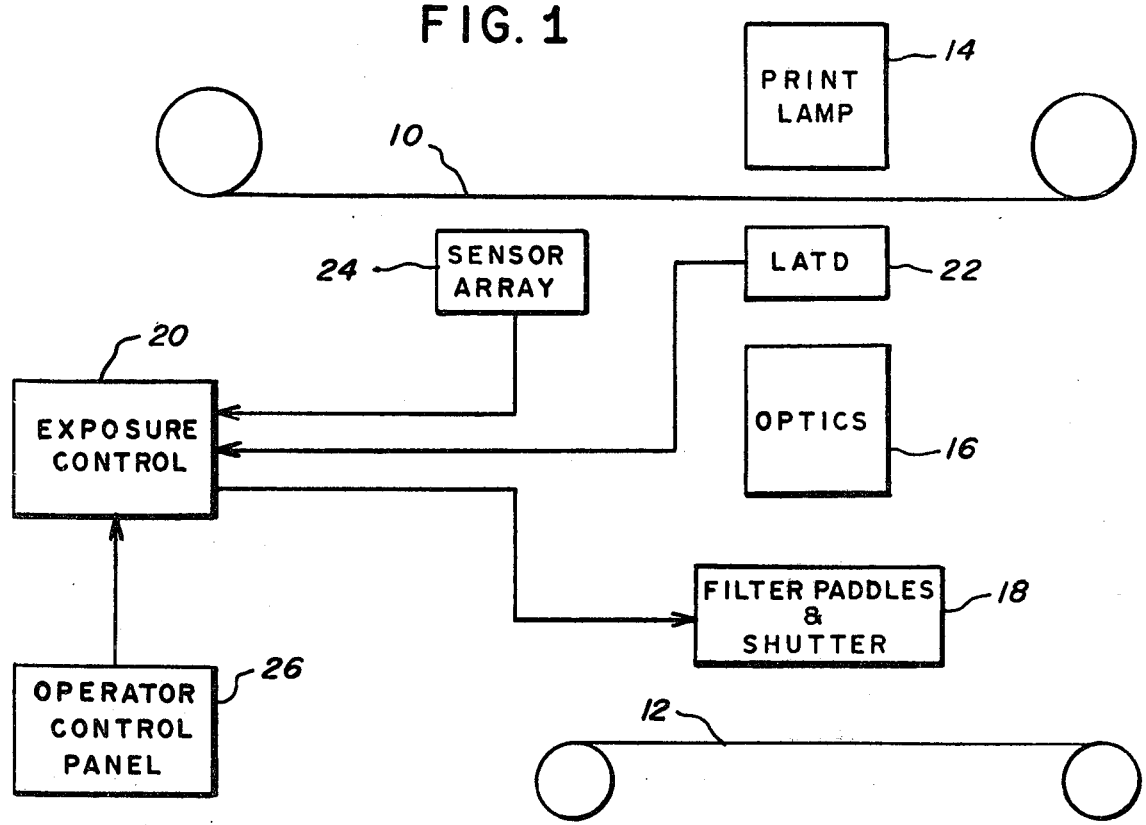
FIG. 1 is a block diagram of a photographic printer.

The present invention is an effective system for classifying and identifying photographic negatives containing snow or beach scenes and then determining the amount of density correction, if any, the identified negatives require. FIG. 1 illustrates a photographic printer system which has been used in one successful embodiment of the present invention. In this printer, an image contained in film 10 is printed onto photosensitive paper 12. Light from print lamp 14 is passed through a frame of film 10 and is focused by optics 16 onto an appropriate portion of paper 12.

The exposure time during which paper 12 is exposed to the image from film 10 is determined by the position of filter paddles and shutter 18. The filter paddles typically include a subtractive filter for each color channel (red, green, and blue). Filter paddles and shutter 18 are controlled by exposure control 20.

In the embodiment shown in FIG. 1, exposure control 20 receives input signals from large area transmission density (LATD) sensors 22, from density or color sensor array 24, and from operator control panel 26. In a preferred embodiment of the present invention, the snow/beach correction requires the LATD sensor signals from LATD sensors 22 and density measurements at individual points on the film sensor array 24. If sensor array 24 is a color sensing array, LATD sensors may not be required, and the signals from sensor array 24 may be used in place of the LATD signals both for the purposes of the snow/beach correction and also for other exposure control functions.

Figure 2:
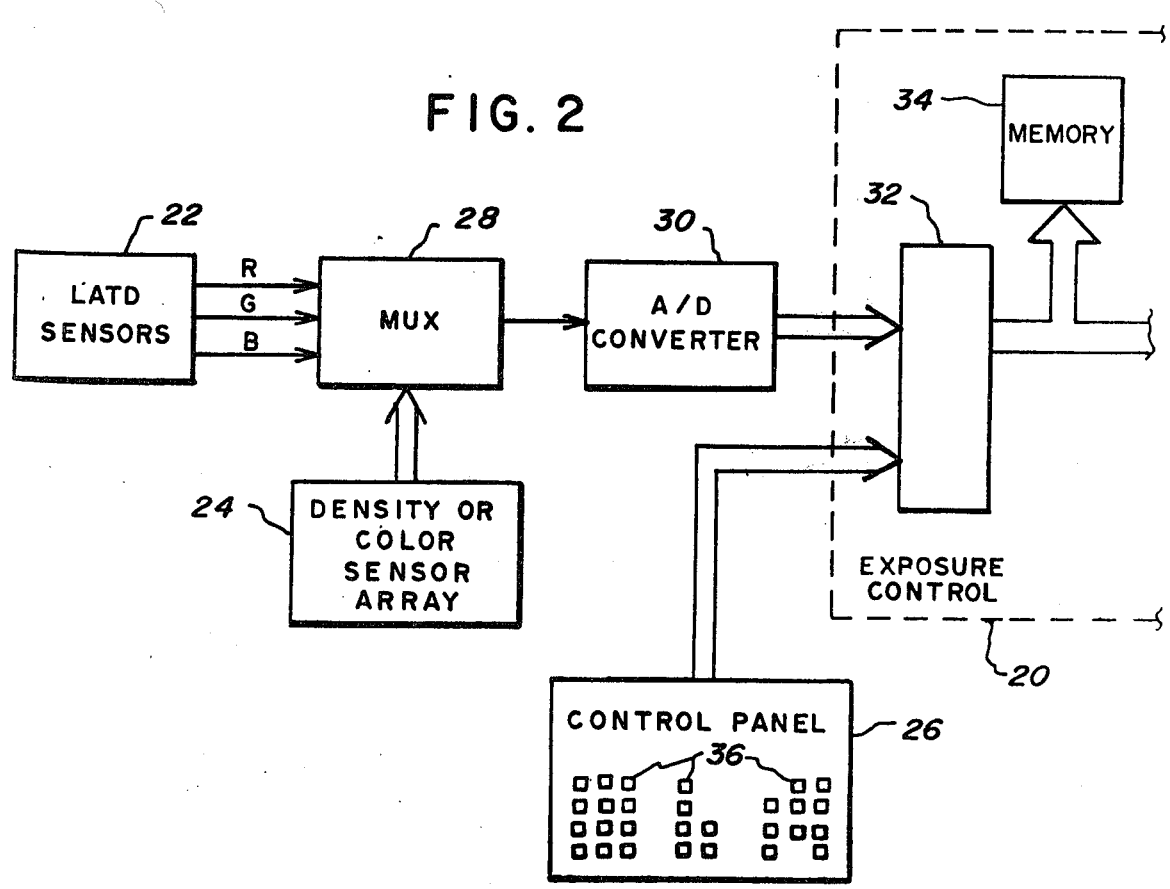
FIG. 2 is a more detailed block diagram of a portion of the photographic printer of FIG. 1.

FIG. 2 shows a more detailed view of a preferred embodiment of a portion of the printer shown in FIG. 1. In FIG. 2, the red, green, and blue signals from LATD sensors 22 and the signals from sensor array 24 are multiplexed by multiplexer 28, converted to digital signals by A/D converter 30 and supplied to a digital processor such as microprocessor 32 of exposure control 20. Also shown in FIG. 2 is memory 34, which Pone, associated with microprocessor 32 and preferably includes both read only memory (ROM) and read/write memory storage. Other portions of the exposure control 20 are not shown in FIG. 2 because they are not critical to the description of the present invention. In one preferred embodiment, exposure control 20 is of the type described in the co-pending patent application entitled "Exposure Time Control" by F. Laciak and J. Poné, Jr., Ser. No. 848,736 filed Nov. 4, 1977 and assigned to the same assignee as the present application.

FIG. 2 also shows a control panel 26 which includes a keyboard having operator-controlled keys or buttons 36. The operator may enter various control and correction signals into exposure control 20 by means of the various buttons 36.

Before discussing in detail the operation of the snow/beach automatic correction of the present invention, a brief discussion of the relationships used in one particular photographic printer for deriving exposure times from correction button values is appropriate. It should be recognized that the following discussion is but one possible technique by which exposure times and exposure corrections are derived. The present invention may be used in conjunction with other systems in which red, green, and blue exposure times are derived from density measurements, and in which density measurements at a plurality of individual points on the negative are made.

Output voltage of the sensor (either an LATD sensor or sensor of array) is directly proportional to intensity on the sensor.

$$I = K_p V \qquad \text{Eq. 1}$$

The definition for negative density, $D_n$, is $$D_n = -\log_{10} T = \log_{10}(1/T) \qquad \text{Eq. 2}$$

where T=transmission and T=1 represents totally transmitting.

Calling $V_0$ a reference intensity/voltage level $$T = V/V_0 = I/I_0. \qquad \text{Eq. 3}$$

Thus, $$D_n = \log_{10} V_0 - \log_{10} V \qquad \text{Eq. 4}$$

In the embodiment described in detail in this application, the following relationship is used to derive individual print times with slope $$t = t_r 10^{S(D_n - D_{nr})} \qquad \text{Eq. 5}$$

t = exposure time
$t_r$ = reference exposure time
S = slope factor
$D_n$ = negative LATD
$D_{nr}$ = reference negative LATD The following relationship between an LATD sensor voltage V and exposure time t, therefore, can be shown $$\log_2 t - \log_2 t_r = S(\log_2 V_r - \log_2 V) \qquad \text{Eq. 6}$$

where $V_r$ = LATD sensor voltage for the reference negative. Since $t_r$, $V_r$, and S are known for a particular printing set-up prior to printing, $\log_2 t$ (and ultimately t) can be derived from $\log_2(1/V)$. The use of $\log_2$ values in deriving exposure times is particularly advantageous since it permits various operations which would involve multiplication or division in the linear domain to be performed as addition or subtraction operations.

Printing systems are generally based on maintaining a constant exposure for all negatives. This implies that $$E = It = \text{constant} \qquad \text{Eq. 7}$$

When slope is incorporated (as in Eq. 5 above) exposure is no longer constant, and the following relationship is used:

$$I^S t = \text{constant} \qquad \text{Eq. 8}$$

A slope center is set by selecting the specific time and voltage/intensity to generate an exposure. Thus $$tV^S = t_0 V_0^S = \text{constant} \qquad \text{Eq. 9}$$

A description of resulting photographic paper density, $D_p$ due to an exposure is $$D_p \approx \gamma \log_{10} E + D_{p0}.$$

This applies in a fashion in the "linear" portion of the "D $\log_{10}$ E" curve. An incremental change in print density can be approximated, keeping intensity constant (since the density change is to come about due to a time change only), as:

$$\Delta D = D_2 - D_1 = \gamma \log_{10} \frac{E_2}{E_1} = \gamma \log_{10} \frac{t_2}{t_1} \qquad \text{Eq. 10}$$

$$\log_2 t_2 = \log_2 t_1 + \frac{\Delta D}{\gamma} \times 3.321928. \qquad \text{Eq. 11}$$

In the present invention, the snow/beach density correction is initially determined in terms of a particular "density button" value, similar to the incremental correction buttons present on operator control panel 26. The other corrections, such as automatic density corrections (ADC) may be determined in a similar manner. In this case, the correction button value is converted to a time change using the following:

$$\frac{\Delta D}{\gamma} \times 3.321928 = \qquad \text{Eq. 12}$$
$$\frac{(\text{Button Value})(\text{Button Increment}) \times 3.321928}{\gamma}$$

This time change is added to the $\log_2 t$ value to increase or decrease exposure time (depending upon the sign of the button value).

Figure 3:
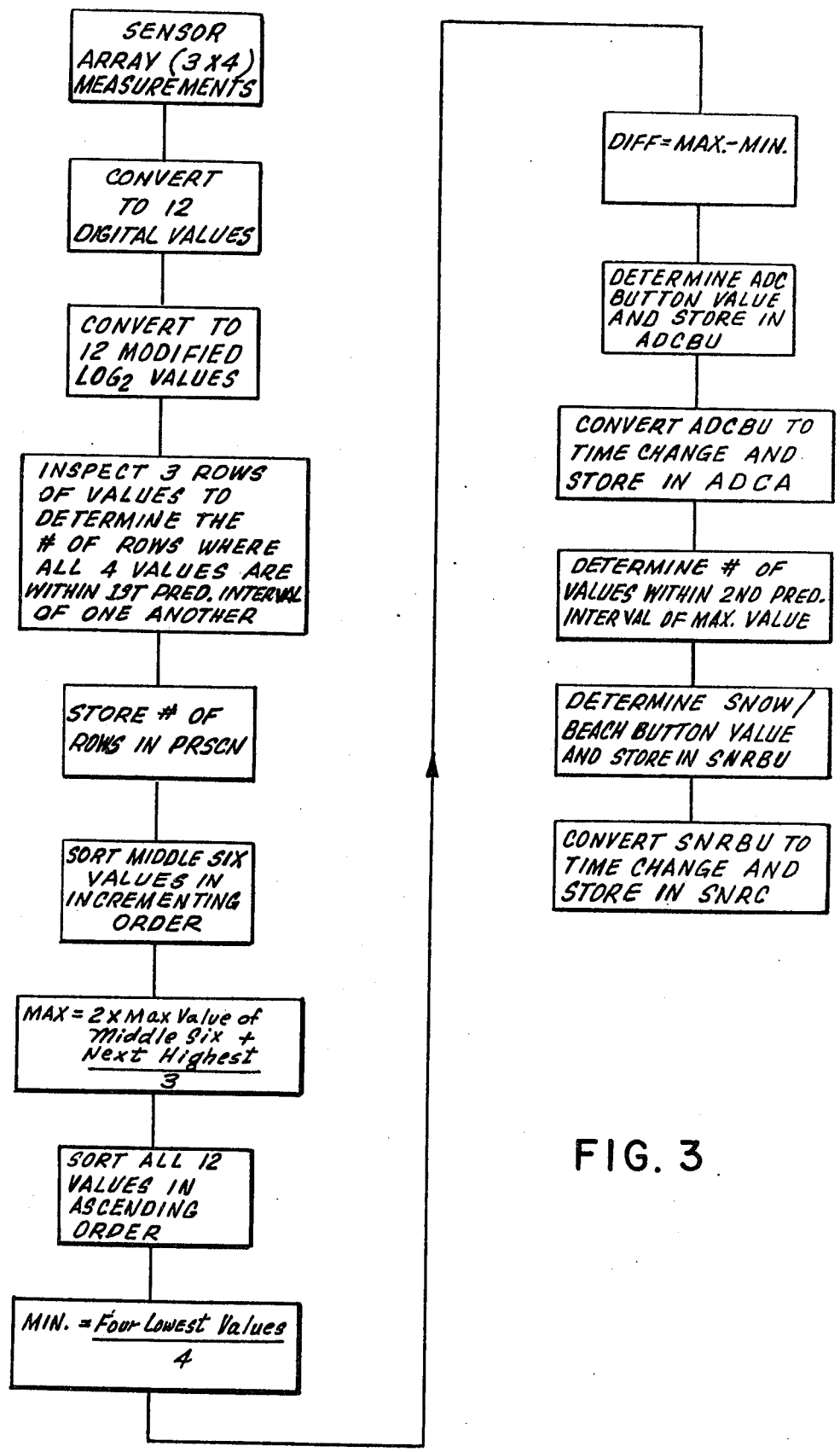
FIGS. 3 and 4 illustrate the functional steps used in the preferred embodiment of the present invention to identify negatives containing snow/beach scenes and to determine the amount of correction, if any, to be provided.
Figure 4:
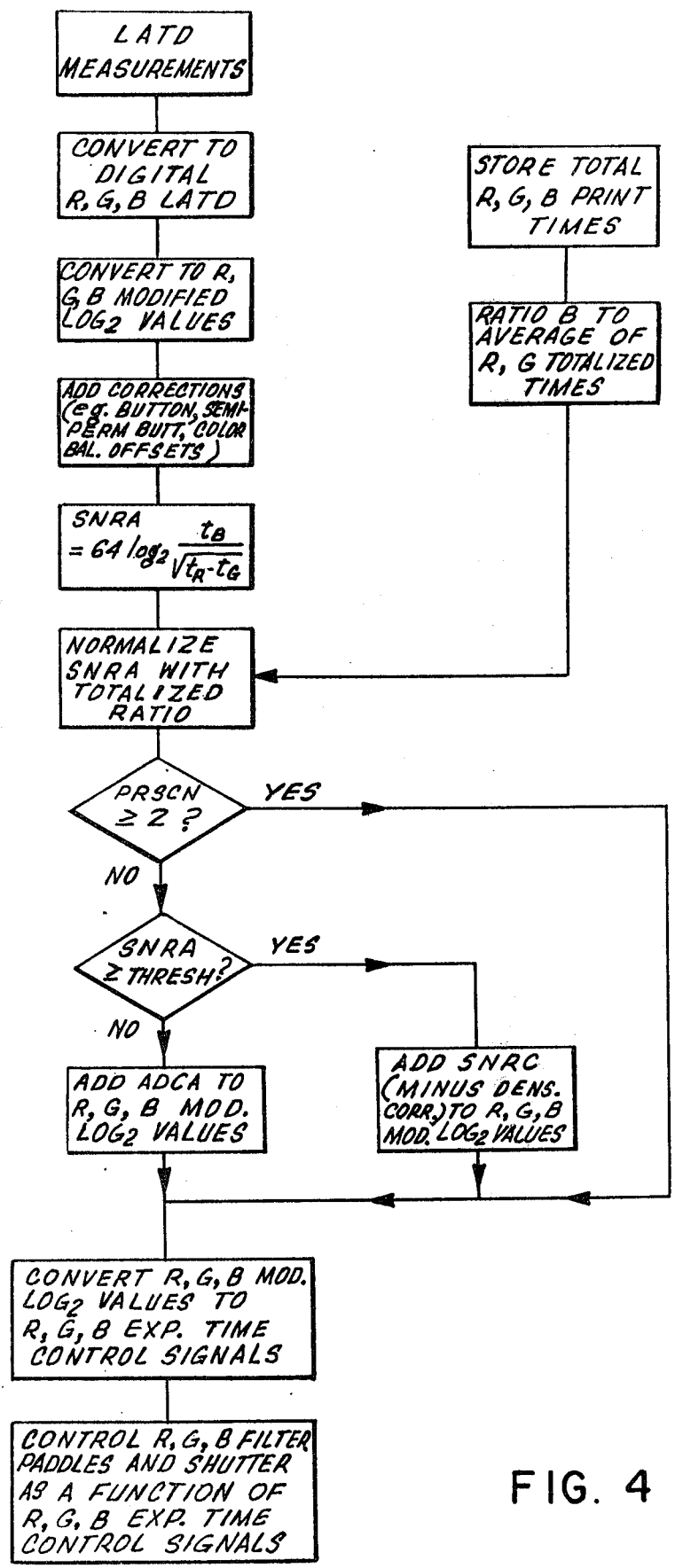

FIGS. 3 and 4 illustrate the operation of exposure control 20 in deriving appropriate snow/beach correction from the sensor array measurements, and in identifying the negatives which require snow/beach correction from the red, green, and blue $\log_2$ values derived from LATD measurements.

For the sake of completeness, the system described in FIGS. 3 and 4 includes two other automatic operations which use the signals from sensor array 24: "automatic density correction" (ADC) and "prairie scan." The specific ADC operation described in FIGS. 3 and 4 and the interrelationship of the various automatic corrections to the ADC operation is a subject matter of the previously mentioned co-pending application by J. Freier, R. Harvey, and J. Poné Jr. entitled "Automatic Exposure Corrections for Photographic Printer."

FIG. 3 illustrates that portion of the operation relating to the sensor array measurements. In a preferred embodiment, the sensor array is three rows of four sensors each which are located at a preview gate which the negative reaches prior to reaching the print gate. The operation shown in FIG. 3 is performed during each automatic exposure cycle, or immediately after a splice reject. Exposure control 20 determines the exposure corrections for the next negative to be printed.

The twelve signals from the twelve sensors of array 24 are multiplexed by multiplexer 28 and converted to digital values by A/D converter 30. These twelve digital values are converted to modified $\log_2$ values which are related to the $\log_2$ of the reciprocal of the digital values. In one preferred embodiment, the automatic calibration technique described in co-pending patent application Ser. No. 862,733 filed Dec. 21, 1977 by R. Laska, and assigned to the same assignee as the present application, is used to normalize the twelve modified $\log_2$ values. These twelve modified $\log_2$ values are multiplied by a scaling factor to yield signals representative of the densities at the twelve sensor points.

The first operation performed using the twelve $\log_2$ values relates to the "prairie scan." The three rows of values are inspected to see if all four of the values in a particular row fall within a first predetermined interval of one another. The number of rows satisfying this condition is stored in PRSCN for later use.

The next operation relates to the ADC operation. The middle six values from the sensor array are sorted in incrementing order keeping the same general six addresses. The value MAX is then determined by taking the average of two times the maximum value of the middle six values plus the next highest value of the middle six. This average value is stored in MAX. The sort flag is then set to indicate that a second sort pass should be performed. During the second sort all twelve values are sorted in ascending order. Once the sort is complete, an average of the four smallest sensor values is calculated and stored in MIN. A modified difference is then determined by subtracting MIN from MAX, and this difference is stored in DIFF.

From the value DIFF, it is possible to determine the appropriate ADC correction button value. In a preferred embodiment, the ADC correction button value is always a positive density correction button and is based upon the following relationship:

$$\text{ADC Button} = X3 \left[ \left( \frac{\text{DIFF} - X1}{X2} \right)^{X4} \right] \qquad \text{Eq. 13}$$

Where
X1+X2−1=Level for no corrections
X2=Increment for successive buttons
X3=Shaping factor multiplier
X4=Shaping factor exponent This may be achieved by means of a lookup table in which DIFF values correspond to particular ADC button values. The particular ADC button value is stored in ADCBU. ADCBU is then converted to a time change using the relationship described in Eq. 12, and the time change is stored in ADCA.

The final operation using the twelve modified $\log_2$ values relates to the determination of the appropriate snow/beach correction. First, exposure control 20 determines the number of density values from sensor array 24 which fall within a second predetermined interval of the maximum density value. Based upon this number, the appropriate snow/beach button value is determined and stored in SNRBU. In a preferred embodiment in which a 3×4 sensor array is used, the button value for snow/beach correction is determined according to the following table:

TABLE 1

| values | button |
|---|---|
| ≧ 9 | −3 |
| ≧ 4 | −2 |
| = 3 | −1 |

TABLE 1-continued

| values | button |
|---|---|
| < 3 | −0 |

It will be noted that the snow/beach correction is always a negative button correction (in contrast to the ADC correction, which is always a positive button correction).

The button value stored in SNRBU is then expanded to an equivalent negative density and converted to a time change value according to the relationship illustrated in Eq. 12. The snow/beach time change value is stored in SNRC.

FIG. 4 illustrates the operation of exposure control 20 when the negative has reached the print gate and LATD measurements have been made by LATD sensors 22. The LATD sensor signals are multiplexed by multiplexer 28 and are converted to digital values by A/D converter 30. These red, green, and blue LATD sensor values are converted to modified $\log_2$ values. Various corrections such as button corrections entered through operator control panel 26, semi-permanent button corrections, color balancing offsets, and the like are added to generate modified $\log_2$ values which are indicative of the red, green, and blue exposure times if neither ADC nor snow/beach automatic corrections are made.

Snow/beach scenes are identified by comparing the blue exposure time to the average of the red and green times. It has been found that snow/beach negatives typically have a higher ratio of blue exposure time to the average of red and green exposure times when compared to other type negatives. To facilitate these calculations in a microprocessor, the ratio was modified as follows:

$$SNRA = 64 \log_2 \frac{t_B}{\sqrt{t_R \cdot t_G}} \qquad \text{Eq. 14}$$

where $$\frac{t_B}{\sqrt{t_R \cdot t_G}} \approx \frac{t_B}{\frac{t_R + t_G}{2}}$$

as long as $t_R \approx t_G$.

From this calculation, a snow ratio (SNRA) value is derived. Because SNRA is derived using $\log_2$ values, the SNRA value differs from a simple time ratio. For example, a time ratio of 1 (i.e. the blue exposure time is equal to the average of the red and green exposure times) yields an SNRA value of zero. A time ratio of 2 gives an SNRA value of 64 and larger time ratios yield SNRA values which are larger than 64.

In some cases, it is advantageous to "normalize" the SNRA prior to determining whether the negative is in face a snow/beach scene. The SNRA, as it is originally derived, assumes that the printer is operating at synchronized printing times on a normal negative. If this is the case, then the SNRA ratio can be defined strictly as the blue time to the average of the red and green times. In some cases, however, the printer does not print to totally synchronized times. This can occur, for example, because over a large sample of negatives the red time is not equal to the green time or is not equal to the blue time. To adjust for this deviation from synchronized printing, the printer of the present invention preferably stores totals of all of the red, green, and blue times over a large number of prints. A totalized average ratio of blue time to red and green times is then taken, and this value is stored for use in normalizing SNRA. Each time an SNRA ratio is calculated, the value is modified or normalized by the value derived from the totalized average ratio. It is this modified or normalized SNRA ratio which is then used to identify negatives containing a snow/beach scene.

As shown in FIG. 4, if the prairie scan data meets a condition which indicates that the negative is a landscape type scene, then neither the snow/beach correction nor the ADC correction is applied; instead, the printer uses the LATD derived exposure times with no automatic corrections. This is the case even if the SNRA ratio would appear to indicate a snow/beach type scene, and even though an ADC correction may have otherwise been applied. The prairie scan overrides both the snow/beach and ADC automatic corrections.

Assuming that the prairie scan does not indicate a landscape scene, the SNRA is compared to a threshold value, and if SNRA exceeds the threshold, the snow/beach correction stored in SNRC is added to the modified $\log_2$ values. In practice, an SNRA threshold in the range of about 30 to about 70 has typically been found to be useful in identifying snow/beach scenes.

In the event that the negative is not a landscape negative and not a snow/beach scene type negative, the time change stored in ADCA is added to the modified $\log_2$ values. This value ranges, in a preferred embodiment, from no time change (corresponding to a zero button correction) to a time change corresponding to a +9 density button correction. In all cases, the time change stored in ADCA is either zero or a positive exposure time change.

It should be noted that in the system described in FIGS. 3 and 4, the ADC correction is made only if the negative has not been identified as a landscape or a snow/beach scene. Since the ADC correction is the largest correction which can be made, all of the negatives are presorted for other types (such as landscapes and snow/beach scenes) first before allowing the ADC correction to be applied.

In conclusion, the present invention is a highly advantageous system for identifying negatives containing snow/beach scenes and for determining the appropriate correction. These determinations are made using measurements of optical characteristics of the negatives.

Although the present invention has been described with reference to preferred embodiments, workers skilled in the art will recognize that changes may be made in form and detail without departing from the spirit and scope of the invention. For example, although a specific exposure control system was described in which the signals from the sensor array and the LATD sensors were converted in a specific manner to obtain signals from which exposure times and exposure corrections are derived, other systems may also utilize the present invention. Similarly, although the present invention is applicable to a printer having LATD sensors and a density sensor array, it may also be used in conjunction with a color scanning system which replaces both the sensor array and the LATD sensors.

What is claimed is:

1. For use with a photographic printer, a system for providing exposure corrections for film originals containing snow/beach type scenes, the system comprising:
   means for identifying film originals containing a snow/beach type scene;
   means for measuring densities of the film original at a plurality of defined areas;
   means for determining the number of defined areas having a measured density within a predetermined interval of the maximum density measured at one of the plurality of defined areas; and
   means for modifying exposures of the identified film originals as a function of the number of defined areas having a measured density within the predetermined interval.

2. The system of claim 1 wherein the means for identifying comprises:
   means for measuring red, green, and blue densities of the film original;
   means for deriving signals indicative of red, green, and blue exposure times from the measured red, green, and blue densities;
   means for comparing the signal indicative of the blue exposure time with the signals indicative of the red and green exposure times; and
   means for identifying film originals containing a snow/beach scene based upon the comparing.

3. The system of claim 2 wherein the means for comparing comprises:
   means for determining a ratio value from the signals indicative of red, green, and blue exposure times, the ratio value being representative of the ratio of the blue exposure time to the average of the red and green exposure times; and
   means for comparing the ratio value to a predetermined threshold value.

4. The system of claim 3 wherein the means for measuring red, green and blue densities comprises red, green, and blue large area transmission density sensors which provide red, green, and blue LATD signals.

5. The system of claim 4 wherein the means for deriving signals comprises:
   A/D converter means for converting the LATD signals from analog to digital LATD signals; and
   log density converting means for converting the digital LATD signals to logarithmic density signals indicative of red, green, and blue exposure times.

6. The system of claim 5 wherein the means for deriving signals further comprises:
   signal correction means for applying exposure corrections to modify the logarithmic density signals.

7. The system of claim 3 wherein the means for comparing further comprises:
   normalizing means for normalizing the ratio value as a function of the relationship of red, green, and blue exposure times for a plurality of photographic print cycles.

8. The system of claim 1 wherein the means for measuring densities comprises:
   a sensor array positioned at a preview gate for measuring densities prior to printing.

9. The system of claim 8 wherein the means for measuring densities further comprises:
   A/D converter means for converting sensor signals from the sensor array from analog to digital sensor signals; and
   log density converting means for converting the digital sensor signals to logarithmic density signals indicative of measured density at each of the plurality of defined areas.

10. The system of claim 9 wherein the means for determining comprises:
    means for selecting the maximum logarithmic density signal; and
    means for counting the number of logarithmic density signals within the predetermined interval of the maximum logarithmic density signal.

11. The system of claim 10 wherein the means for modifying exposures comprises:
    means for determining a snow/beach button correction value as a function of the number counted by the means for counting; and
    means for converting the snow/beach correction value to a signal indicative of a snow/beach exposure time change.

12. The system of claim 11 wherein the means for modifying further comprises:
    means for storing the signal indicative of a snow/beach exposure time change; and
    means for adding the signal indicative of a snow/beach exposure time change to signals indicative of desired red, green, and blue exposure times when a film original is identified as containing a snow/beach type scene.

13. For use with a photographic printer, a system for providing exposure corrections for film originals containing snow/beach type scenes, the system comprising:
    means for measuring red, green, and blue densities of the film original;
    means for deriving signals indicative of red, green, and blue exposure times from the measured red, green, and blue densities;
    means for identifying film originals containing a snow/beach scene based upon a comparison of the signal indicative of the blue exposure time with the signals indicative of the red and green exposure times; and
    means for providing snow/beach scene exposure corrections for identified film originals.

14. The system of claim 13 wherein the means for identifying comprises:
    means for determining a ratio value from the signals indicative of red, green, and blue exposure times, the ratio value being representative of the ratio of the blue exposure time to the average of the red and green exposure times; and
    means for comparing the ratio value to a predetermined threshold value.

15. The system of claim 14 wherein the means for measuring red, green, and blue densities comprises red, green, and blue large area transmission density sensors which provide red, green, and blue LATD signals.

16. The system of claim 15 wherein the means for deriving signals comprises:
    A/D converter means for converting the LATD signals from analog to digital LATD signals; and
    log density converting means for converting the digital LATD signals to logarithmic density signals indicative of red, green, and blue exposure times.

17. The system of claim 16 wherein the means for deriving signals further comprises:
    signal correction means for applying exposure corrections to modify the logarithmic density signals.

18. The system of claim 14 wherein the means for identifying further comprises:

normalizing means for normalizing the ratio value as a function of the relationship of red, green, and blue exposure times for a plurality of photographic print cycles.

19. For use with a photographic printer, a system for providing exposure corrections for film originals containing snow/beach type scenes, the system comprising:

means for measuring red, green, and blue densities of the film originals;

means for measuring densities of the film original at a plurality of defined areas;

means for deriving signals indicative of red, green, and blue exposure times based upon the measured red, green, and blue densities;

means for comparing the signal indicative of the blue exposure time with the signal indicative of the red and green exposure times;

means for determining the extent of contrast in the film negative based upon the measured densities at the plurality of defined areas; and means for modifying the exposure times based upon the comparison of the blue exposure time to the red and green exposure times and upon the determination of the extent of contrast of the film originals.

* * * * *